(12) United States Patent
Duan

(10) Patent No.: US 7,049,376 B2
(45) Date of Patent: May 23, 2006

(54) CATALYST COMPOSITION AND PROCESS THEREWITH

(75) Inventor: Jiwen F Duan, Apex, NC (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/104,083

(22) Filed: Apr. 12, 2005

(65) Prior Publication Data

US 2005/0182237 A1    Aug. 18, 2005

Related U.S. Application Data

(62) Division of application No. 09/770,116, filed on Jan. 24, 2001, now Pat. No. 6,914,107.

(51) Int. Cl.
*C08F 116/12*    (2006.01)

(52) U.S. Cl. .................................. 526/89; 526/333

(58) Field of Classification Search ................ 526/333, 526/89
See application file for complete search history.

(56) References Cited

U.S. PATENT DOCUMENTS

| | | |
|---|---|---|
| 3,121,109 A | 2/1964 | Young |
| 3,784,507 A | 1/1974 | Braunstein |
| 3,970,729 A | 7/1976 | Walsh |
| 4,526,725 A | 7/1985 | Deardorff et al. |
| 5,104,842 A | 4/1992 | Garapon et al. |
| 5,237,042 A | 8/1993 | Kim et al. |
| 5,340,907 A | 8/1994 | Yau et al. |
| 5,453,479 A | 9/1995 | Borman et al. |
| 5,656,716 A | 8/1997 | Schmidt et al. |
| 5,684,116 A | 11/1997 | Martl et al. |
| 5,798,433 A | 8/1998 | Schmidt et al. |
| 5,898,058 A | 4/1999 | Nichols et al. |
| 5,922,828 A | 7/1999 | Schiraldi |
| 6,013,756 A | 1/2000 | Hagen et al. |
| 6,133,404 A | 10/2000 | Kang et al. |

FOREIGN PATENT DOCUMENTS

| | | |
|---|---|---|
| EP | 0 699 700 A2 | 3/1996 |
| EP | 0812818 A1 | 12/1997 |
| EP | 0 985 752 A1 | 3/2000 |
| EP | 1 016 741 A1 * | 7/2000 |
| JP | 6-170911 A | 6/1994 |
| JP | 11158260 A | 6/1999 |
| JP | 11-236442 A | 8/1999 |
| WO | WO 97/47675 A | 12/1997 |
| WO | WO 99/28033 A | 6/1999 |
| WO | WO 99/28033 A1 | 6/1999 |
| WO | WO 99/28033 * | 10/1999 |

OTHER PUBLICATIONS

Allbright literature training dated Jun. 15, 1999 titled "The Polyethylene Terephthalate Industry".

* cited by examiner

Primary Examiner—Robert D. Harlan

(57) ABSTRACT

A composition that can be used as a catalyst is disclosed. The composition comprises, or is produced by combining, a titanium compound, a glycol, a phosphorus compound, and optionally water. Also disclosed is a process that can be used for producing a polyester. The process comprises contacting, in the presence of a catalyst composition, a carbonyl compound and an alcohol under a condition suitable for esterification, transesterification, or polymerization. The catalyst composition comprises, or is produced by combining, a titanium compound, a glycol, a phosphorus compound, and optionally water.

10 Claims, No Drawings

US 7,049,376 B2

CATALYST COMPOSITION AND PROCESS THEREWITH

This is a divisional application of Ser. No. 09/770,116, filed Jan. 24, 2001, now U.S. Pat. No. 6,914,107.

FIELD OF THE INVENTION

This invention relates to a composition comprising either (1) a titanium compound, a glycol, a phosphorus compound, and optionally water or (2) a titanium compound, a glycol, water, and optionally a phosphorus compound and to a process for producing polyester.

BACKGROUND OF THE INVENTION

Polyesters such as, for example, polyethylene terephthalate, polytrimethylene terephthalate and polybutylene terephthalate, generally referred to as "polyalkylene terephthalates", are a class of important industrial polymers. They are widely used in fibers, films, and molding applications.

Polyesters can be produced by transesterification of an ester such as dimethyl terephthalate (DMT) with a glycol followed by polycondensation or by direct esterification of an acid such as terephthalic acid (TPA) with a glycol followed by polycondensation. A catalyst is used to catalyze the esterification, transesterification and/or polycondensation.

For example, polyester can be produced by injecting a slurry mixture of TPA and glycol at about 80° C. into an esterifier. Linear oligomer with degree of polymerization less than 10 are formed in one or two esterifiers at temperatures from 240° C. to 290° C. The oligomer is then polymerized in one or two prepolymerizers and then a final polymerizer or finisher at temperatures from 250° C. to 300° C. TPA esterification is catalyzed by the carboxyl groups of the acid.

Antimony is often used for polymerization or polycondensation reaction. Three forms of antimony are widely used in commercial production, antimony oxide ($Sb_2O_3$), antimony glycolate, and antimony acetate. However, antimony forms insoluble antimony complexes that plug the spinnerets in fiber spinning and leads to frequent shutdowns to wipe spinnerets clean of precipitated antimony compounds. The antimony-based catalysts are also coming under increased environmental pressure and regulatory control, especially in food contact applications.

Titanium catalysts can be used in esterification, transesterification, and polycondensation reactions. For example, organic titanates, such as tetraisopropyl and tetra n-butyl titanates, are known to be effective polycondensation catalysts for producing polyalkylene terephthalates. However, the titanium catalysts tend to hydrolyze on contact with water forming glycol-insoluble oligomeric species, which lose catalytic activity. Polyesters produced from an organic titanate also generate yellow discoloration.

Titanium glycolate, formed from glycol and tetraalkyl titanate, has been shown to be useful as polycondensation catalyst. For example, JP57038817, SU602503, JP50016796, JP49057092, JP46003395, and JP45004051 disclose titanium glycolate solution for polyester polymerization. U.S. Pat. No. 3,121,109 also discloses the use of a titanium glycolate as catalyst in the presence of 2–20 parts of water per part of titanium. Both titanium glycolates and the water-containing titanium glycolate, however, react in the presence of air to form solids thereby becoming insoluble. See also JP07207010, U.S. Pat. Nos. 5,106,944, and 5,017,680 disclosing titanium catalyst solution produced from titanium tetraalkyl titanate and a salt. These titanium catalyst solutions stabilized by these metal salts are stable in air, but form solids or gel upon exposure to water and then air. Those solids can plug injection nozzle, pipe, or other process equipment in the polyester manufacturing process causing production interruptions.

Therefore, there is an increasing need for developing a catalyst that is stable in air, water, or both, is efficient, produces a polymer with reduced color, exhibits good catalytic activity, does not plug process equipment, and is environmentally friendly.

An advantage of the present invention catalyst composition is that the composition does not precipitate over prolonged storage or when used in process equipment, which contains air. Other advantages will become more apparent as the invention is more fully disclosed herein below.

SUMMARY OF THE INVENTION

A first embodiment of the invention provides a composition that can be used for producing polyester. The composition comprises or is produced by combining a titanium compound, a glycol, a phosphorus compound, and optionally water.

A second embodiment of the invention also provides a composition that can be used for producing polyester. The composition comprises or is produced by combining a titanium compound, a glycol, water, and optionally a phosphorus compound.

A third embodiment of the invention provides a process that can be used for producing polyester. The process comprises contacting, in the presence of a catalyst composition, a carbonyl compound and an alcohol in which the composition can be the same as that disclosed in the first or second embodiment of the invention.

DETAILED DESCRIPTION OF THE INVENTION

According to the first embodiment of the invention, the composition can comprise, consist essentially of, or consist of a titanium compound, a glycol, a phosphorus compound, and optionally water or a reaction product of a titanium compound, a glycol, a phosphorus compound, and optionally water; and can be produced by combining the titanium compound, the glycol, the phosphorus compound, and optionally water.

According to the second embodiment of the invention, the composition can comprise, consist essentially of, or consist of a titanium compound, a glycol, water, and optionally a phosphorus compound or a reaction product of a titanium compound, a glycol, and optionally a phosphorus compound; and can be produced by combining the titanium compound, the glycol, water, and optionally the phosphorus compound.

The titanium compound, glycol, and phosphorus compound for the first and second embodiments can be the same and are disclosed hereinbelow.

The preferred titanium compounds are organic titanium compounds. Titanium tetrahydrocarbyloxides, also referred to as tetraalkyl titanates herein, are presently most preferred organic titanium compounds because they are readily available and effective. Examples of suitable titanium tetrahydrocarbyloxide compounds include those having the formula of $Ti(OR)_4$ where each R is individually selected from an alkyl, cycloalkyl, alkaryl, hydrocarbyl radical containing from 1 to about 30, preferably 2 to about 18, and most preferably 2 to 12 carbon atoms per radical and each R can be the same or different. Titanium tetrahydrocarbyloxides in which the hydrocarboxyl group contains from 2 to about 12 carbon atoms per radical which is a linear or branched alkyl radical are most preferred because they are relatively inexpensive, more readily available, and effective in forming the solution. Suitable titanium tetrahydrocarbyloxides include, but are not limited to, titanium tetraethoxide, titanium tetrapropoxide, titanium tetraisopropoxide, titanium tetra-n-butoxide, titanium tetrahexoxide, titanium tetra 2-ethylhexoxide, titanium tetraoctoxide, and combinations of two or more thereof. The titanium tetrahydrocarbyloxides are well known to one skilled in the art. See, for example, U.S. Pat. Nos. 6,066,714 and 6,166,170, the description of which is incorporated herein by reference. Examples of commercially available organic titanium compounds include, but are not limited to, TYZOR® TPT and TYZOR® TBT (tetra isopropyl titanate and tetra n-butyl titanate, respectively) available from E. I. du Pont de Nemours and Company, Wilmington, Del. U.S.A.

The glycol can be an alkylene glycol, a polyalkylene glycol or alkoxylated alcohol, or combinations of two or more thereof. Examples of suitable glycol include, but are not limited to, ethylene glycol, propylene glycol, isopropylene glycol, butylene glycol, 1-methyl propylene glycol, pentylene glycol, diethylene glycol, triethylene glycol, and combinations of two or more thereof. The presently preferred glycol is ethylene glycol.

Any phosphorus compounds that can be used with a titanium-containing catalyst can be used in the invention to produce a soluble solution. Examples of suitable phosphorus compounds include, but are not limited to, a polyphosphoric acid or a salt thereof, a phosphonate ester, a pyrophosphoric acid or salt thereof, a pyrophosphorous acid or salt thereof, and combinations of two or more thereof. The polyphosphoric acid can have the formula of $H_{n+2}P_nO_{3n+1}$ in which n is $\geq 2$. The phosphonate ester can have the formula of $(R^1O)_2P(O)ZCO_2R^1$ in which each $R^1$ can be the same or different and can be independently H, $C_{1-4}$ alkyl, or combinations thereof; and Z is $C_{1-5}$ alkylene, $C_{1-5}$ alkylidene, or combinations thereof, di(polyoxyethylene) hydroxymethyl phosphonate, and combinations of two or more thereof. The salt can be an alkali metal salt, alkaline earth metal salt, ammonium salt, or combinations of two or more thereof.

Illustrative examples of suitable phosphorus compounds include, but are not limited to, potassium tripolyphosphate, sodium tripolyphosphate, potassium tetra phosphate, sodium pentapolyphosphate, sodium hexapolyphosphate, ethy phosphonate, propyl phosphonate, hydroxymethyl phosphonate, di(polyoxyethylene) hydroxymethyl phosphonate, methylphosphonoacetate, ethyl methylphosphonoacetate, methyl ethylphosphonoacetate, ethyl ethylphosphonoacetate, propyl dimethylphosphonoacetate, methyl diethylphosphonoacetate, triethyl phosphonoacetate, hydroxymethylphosphonate, di(polyoxyethylene) hydroxymethyl phosphonate, triethyl phosphonoacetate, or combinations of two or more thereof. The presently preferred phosphorus compound is potassium tripolyphosphate.

The composition can contain titanium in the range of from about 0.0001% to about 10% such that the composition is substantially stable in air and water, preferably 0.01% to 10%, and most preferably 0.1% to 8% by weight. The composition can contain phosphorous such that the P/Ti molar ratio is in the range of about 0.001:1 to about 20:1, preferably about 0.01:1 to about 10:1, and most preferably 0.2:1 to 1:1. Water and a solvent such as a glycol, if present, can make up the rest of the composition. The term "substantially stable" refers to being soluble in water in the presence of air or oxygen for at least 1 day at room temperature.

The titanium compound, glycol, and phosphorus compound can be combined, by any means known to one skilled in the art, under a suitable condition effective to the production of the composition or a reaction product. The condition can include a temperature in the range of from about 0° C. to about 200° C., preferably about 50° C. to about 120° C., and most preferably 50° C. to 80° C., under a pressure that can accommodate the temperature range, and for a period of time sufficient to produce the composition or the reaction product.

The titanium compound, glycol, and phosphorus compound can be combined in any order. It is preferred that a phosphorus compound is first dissolved in a glycol to produce a solution. Thereafter, a titanium compound is added to the solution. If desired, the combination can be aided with a mixing such as, for example, a mechanical agitation. Generally when a titanium compound is combined with the glycol/phosphorus solution, heat is generated indicating some reaction among them. Wishing not to be bound by theory, one of the main reaction products is probably titanium glycolate, which is in complex with the phosphorus compound.

The composition of the invention can be produced on site where it is to be used for, for example, polymerization of an acid and an alcohol. It can also be made in another location, optionally at a high titanium or total solids concentration, and transported to the site for use. It can also be made in another plant or location at higher concentration.

When the composition is a reaction product of the titanium compound, glycol, and phosphorus compound, the reaction product can be used as produced without further purification. It can also be further purified by any means known to one skilled in the art if desired. For example, the solution of tetraisopropyl titanate/glycol/potassium tripolyphosphate can be heated between 40° C. and 200° C., preferably between 60° C. and 120° C., to remove and condense isopropyl alcohol.

The composition of the invention is preferably substantially soluble in a solvent. The term "substantially" means more than trivial. It is preferred that the composition be completely soluble in the solvent. However, a substantial portion of the composition can also be suspended or dispersed in the solvent.

Any solvent that can substantially dissolve the catalyst composition disclosed above can be used in the present invention. The presently preferred solvent is water or an alcohol such as an alkylene glycol, a polyalkylene glycol or alkoxylated alcohol, or combinations of two or more thereof. The most preferred solvent is alkylene glycol.

The composition comprising or produced by combining a titanium compound, a glycol, phosphorus compound, and optionally water can contain about 0.001% to about 8% titanium and about 92% to about 99.999% glycol, or about 0.001% to about 8% is titanium, about 0% to about 60% is water, and about 40% to about 99.999% is glycol.

The composition comprising or produced by combining a titanium compound, a glycol, and water without phosphorus can contain about 0.001% to 1.0%, preferably 0.05% to 0.5%, titanium by weight; about 1% to about 80%, preferably about 5% to about 50%, most preferably 10% to 30% water by weight; and about 20% to about 99%, preferably 50% to 95%, glycol by weight.

According to the third embodiment of the invention, a process that can be used to produce an ester or polyester is provided. The process comprises contacting, in the presence of a catalyst composition, a carbonyl compound and an alcohol under a condition sufficient to effect the production of a polymer. The composition can be the same as that disclosed above in the first or second embodiment of the invention.

According to the invention, any carbonyl compound that, when combined with an alcohol, can produce an ester or polyester. Such carbonyl compounds include, but are not limited to, acids, esters, amides, acid anhydrides, acid halides, salts of carboxylic acid oligomers or polymers having repeat units derived from an acid, or combinations of two or more thereof. The presently preferred acid is an organic acid such as a carboxylic acid or salt thereof.

A preferred process for producing an ester or polyester comprises, consists essentially of, or consists of contacting a reaction medium with the catalyst composition disclosed above. The reaction medium can comprise, consist essentially of, or consist of an alcohol and either (1) an organic acid, a salt thereof, an ester thereof, or combinations thereof or (2) an oligomer having repeat units derived from an organic acid or ester.

The organic acid or ester thereof can have the formula of $R^2COOR^2$ in which each $R^2$ independently can be (1) hydrogen, (2) hydrocarboxyl radical having a carboxylic acid group at the terminus, or (3) hydrocarbyl radical in which each radical has 1 to about 30, preferably about 3 to about 15 carbon atoms per radical which can be alkyl, alkenyl, aryl, alkaryl, aralkyl radical, or combinations of two or more thereof. The presently preferred organic acid or ester thereof has the formula of $R^2O_2CACO_2R^2$ in which A is an alkylene group, an arylene group, alkenylene group, or combinations of two or more thereof and $R^2$ is the same as above. Each A has about 2 to about 30, preferably about 3 to about 25, more preferably about 4 to about 20, and most preferably 4 to 15 carbon atoms per group. Examples of suitable organic acids include, but are not limited to, terephthalic acid, isophthalic acid, naphthalic acid, succinic acid, adipic acid, phthalic acid, glutaric acid, acrylic acid, oxalic acid, benzoic acid, maleic acid, propenoic acid, and combinations of two or more thereof. The presently preferred organic diacid is terephthalic acid because the polyesters produced therefrom have a wide range of industrial applications. Examples of suitable esters include, but are not limited to, dimethyl adipate, dimethyl phthalate, dimethyl terephthalate, methyl benzoate, dimethyl glutarate, bis-glycolate ester of 5-sulfo isophthalate sodium salt, and combinations of two or more thereof.

Any alcohol that can esterify an acid to produce an ester or polyester can be used in the present invention. The presently preferred alcohol is an alkylene glycol of the formula $(HO)_nA(OH)_n$ A and n are the same as those disclosed above. Examples of suitable alcohols include, but are not limited to, ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, and combinations of two or more thereof. The presently most preferred alcohol is an alkylene glycol such as ethylene glycol for the polyester produced therefrom has a wide range of industrial applications.

The oligomer of a carbonyl compound such as TPA and alcohol generally has a total of about 2 to about 100, preferably from about 2 to about 20 repeat units derived from the carbonyl compound and alcohol.

The contacting of the carbonyl compound and alcohol in the presence of the catalyst can be carried out by any suitable means.

Any suitable condition to effect the production of an ester or polyester can include a temperature in the range of from about 150° C. to about 500° C., preferably about 200° C. to about 400° C., and most preferably 250° C. to 300° C. under a pressure in the range of from about 0.001 to about 1 atmosphere for a time period of from about 0.2 to about 20, preferably about 0.3 to about 15, and most preferably 0.5 to 10 hours.

The molar ratio of the alcohol to carbonyl compound can be any ratio so long as the ratio can effect the production of an ester or polyester. Generally the ratio can be in the range of from about 1:1 to about 10:1, preferably about 1:1 to about 5:1, and most preferably 1:1 to 4:1.

The catalyst, expressed as Ti, can be present in the range of about 0.0001 to about 30,000 parts per million by weight (ppmw) of the medium comprising the carbonyl compound and alcohol, preferably about 0.001 to about 1,000 ppmw, and most preferably 1 to 100 ppmw. Other ingredients also can be present to enhance catalyst stability or performance.

The catalyst composition can be used in producing esters or polyesters by using any of the conventional melt or solid state techniques. The catalyst composition is also compatible with conventional esterification, transesterification, and polycondensation catalysts such as, for example, manganese, cobalt, and/or zinc salts and can be introduced to the production process concurrent with, or following, introduction of other esterification catalyst.

EXAMPLES

The following Examples are provided to further illustrate the invention and are not to be construed as to unduly limit the scope of the invention. All TYZOR® products noted in the examples were obtained from DuPont, Wilmington, Del., USA.

Example 1

This example shows that the preparation of the invention composition and that the invention composition is stable in air for a prolonged period.

Potassium tripolyphosphate (KTPP; 17 g) was added to ethylene glycol (807.5 g) in an open flask followed by heating at 60° C. in 40 minutes to completely dissolve KTPP to make a solution. TYZOR® TPT (tetraisopropyl titanate; TPT; 161.5 g) was slowly added to the solution to produce a clear solution weighing 982.9 g, a loss of 3.1 g (theoretical weight, 986 g). The clear solution was heated at 100° C. for one hour, the clear solution weight decreased to 868.4 g, and to 839.1 g after 2 hours at 100° C., mainly due to the evaporation of isopropyl alcohol and ethylene glycol.

In a separate run, ethylene glycol (34.754 g) and KTPP (0.498 g) were mixed in an open glass beaker and the resulting mixture was heated to 60° C. with stirring until KTPP was dissolved to produce a glycol/KTPP solution. TPT (4.748 g) was added to the glycol/KTPP solution to produce a titanium/glycol/KTPP solution, which was clear, had no solids, and contained about 2.0% titanium having a P/Ti molar ratio of 0.2.

A portion of the titanium/glycol/KTPP solution was placed in another open glass beaker under hood to accelerate air exposure at room temperature (about 25° C.) and remained clear after 1 day.

A portion (10.57 g) of the titanium/glycol/KTPP solution was mixed with water (2.87 g) in another open glass beaker and the resulting water solution was clear without solids.

The water solution was placed in an open glass beaker under hood to accelerate air exposure at room temperature and remained clear after 1 day. Without KTPP, the titanium/glycol solution, if not in sealed container, reacted with the oxygen or air to form solids after exposing to air for 2 hours or longer. Without KTPP, the titanium/glycol solution was soluble in water if titanium content was lower than 0.8% by weight. The solution became insoluble if the titanium content was higher than 0.8%.

Example 2

This example shows that the invention composition is stable in air for a prolonged period.

Ethylene glycol (28.015 g) and KTPP (2.489 g) were mixed in an open glass beaker to form a mixture, which was heated to 60° C. and stirred until KTPP was dissolved to produce a KTPP/glycol solution. TPT (9.496 g) was added to the glycol/KTPP solution to produce a titanium/glycol/KTPP solution, which was semi-transparent, had no solids, and contained about 4.0% titanium having a P/Ti molar ratio of 0.5.

A portion of the titanium/glycol/KTPP solution was placed in another open glass beaker under hood as in EXAMPLE 1 and remained semi-transparent.

A portion (7.30 g) of the titanium/glycol/KTPP solution was mixed with water (2.83 g) in another open glass beaker and the resulting water solution was more transparent without solids. The water solution was placed in an open glass beaker under hood as in EXAMPLE 1 and remained the same after 1 day.

Example 3

This example illustrates that a titanium/glycol solution plugged injection nozzle and process pipe in a continuous polyester manufacturing process of a pilot plant with throughput 56.7 kg/hour. The polyester manufacturing process is a conventional process well known to one skilled in the art and the description of which is omitted herein for the interest of brevity.

Ethylene glycol (179 kg) was added to a mix tank followed by addition of 1.068 kg of TPT, while being agitated to produce a clear titanium/glycol solution that contained 0.1% titanium. The solution was pumped to a feed tank, having an injection nozzle and pipe, from where it was injected at a rate of 8.6 ml/min to an oligomer line of the polyester manufacturing process.

After 1 day, the solution in the feed tank formed solids and became cloudy because the feed tank and injection pipe were not air-free. After 3 day, the injection nozzle and pipe were plugged by the solids. The process was forced to shut down.

Example 4

This example illustrates that the invention composition did not plug injection nozzle and pipe in a polyester manufacturing process.

Ethylene glycol (8.12 kg) and KTPP (0.30 kg) were added to a mix tank to produce a mixture that was agitated for 1 hour at 60° C. to produce a KTPP/glycol solution, to which 1.13 kg of TPT was added to produce a 9.5 kg concentrated titanium/KTPP/glycol solution containing about 2.0% Ti.

The concentrated solution was mixed with 181.4 kg of ethylene glycol in a mix tank at room temperature in a pilot plant to produce a clear, diluted titanium/KTPP/glycol solution containing 0.1% titanium, having a P/Ti molar ratio of 0.5.

The diluted titanium/KTPP/glycol solution was then pumped to the feed tank and from which it was injected, at a rate of 8.6 ml/min, to the oligomer line as described in EXAMPLE 3. No antimony or other catalyst was injected. After 3 day, the solution in the feed tank remained clear containing no solids. The injection nozzle and pipe also remained clear. The polymerization continued, without addition of antimony, to produce polyethylene terephthalate (PET). This PET contained 0.04% $TiO_2$ by weight. The polymer had good quality.

Example 5

Ethylene glycol (15.88 g), TPT (0.1187 g), and water (4.00 grams) were mixed in an open beaker to make solution containing 0.1 % Ti, 20% water, and 79.9% glycol. The solution had blue tone and became clear after 15 minutes.

After 2 hours under hood exposed to air, it remained as clear solution. After 16 hours under hood, it was the same clear solution.

Example 6

This example further shows another invention composition containing different a phosphorus compound.

Ethylene glycol (28.015 g) and potassium pyrophosphate (KPP; 1.68 g) are mixed in an open glass beaker to form a mixture, which is heated to 60° C. and stirred until KPP is dissolved to produce a KPP/glycol solution. TPT (2.9 g) is added to the glycol/KPP solution to produce a titanium/glycol/KPP solution containing 1.5% titanium having a P/Ti molar ratio 0.5

A portion (7.3 g) of the titanium/glycol/KPP solution is mixed with water (2.83 g) in another open glass beaker to produce a composition in water.

What is claimed is:

1. A process comprising contacting, in the presence of a catalyst composition, a carbonyl compound and an alcohol wherein said composition remains soluble upon being exposed to air at about 25° C. and
   (a) consists essentially of or is a reaction product of a titanium compound, a glycol, a phosphorus compound, and optionally water wherein said phosphorus compound is selected from the group consisting of a polyphosphoric acid or a salt thereof, a phosphonate ester, a pyrophosphoric acid or salt thereof, a pyrophosphorous acid or salt thereof, and combinations of two or more thereof; or
   (b) comprises or is produced by combining a titanium compound, a glycol, a phosphorus compound, and optionally water wherein said phosphorus compound is selected from the group consisting of potassium tripolyphosphate, sodium tripolyphosphate, potassium tetra phosphate, sodium pentapolyphosphate, sodium hexapolyphosphate, ethyl phosphonate, propyl phosphonate, hydroxymethyl phosphonate, di(polyoxyethylene) hydroxymethyl phosphonate, methylphosphonoacetate, ethyl methylphosphonoacetate, methyl ethylphosphonoacetate, ethyl ethylphosphonoacetate, propyl dimethylphosphonoacetate, methyl diethylphosphonoacetate, triethyl phosphonoacetate, hydroxymethylphosphonate, di(polyoxyethylene)

hydroxymethyl phosphonate, triethyl phosphonoacetate, or combinations of two or more thereof.

2. A process according to claim 1 wherein said titanium compound has the formula Ti(OR)$_4$ and each R is independently selected from the group consisting of an alkyl radical, a cycloalkyl radical, aralkyl radical, and combinations of two or more thereof contains from 1 to about 30 carbon atoms per radical.

3. A process according to claim 1 wherein said titanium compound is selected from the group consisting of tetra isopropyl titanate, tetra n-butyl titanate, and combinations thereof.

4. A process according to claim 2 wherein said carbonyl compound has the formula of $R^2COOR^2$; each $R^2$ is independently selected from the group consisting of (1) hydrogen, (2) hydrocarboxyl radical having a carboxylic acid group at the terminus, or (3) hydrocarbyl radical in which each radical has 1 to about 30, preferably about 3 to about 15 carbon atoms per radical which can be alkyl, alkenyl, aryl, alkaryl, aralkyradical, (4) a 5-sulfo isophthalate metal salt or its ester, and (5) combinations of two or more thereof.

5. A process according to claim 2 wherein said carbonyl compound is selected from the group consisting of terephthalic acid, dimethyl terephthalate, isophthalic acid, naphthalic acid, succinic acid, adipic acid, phthalic acid, glutaric acid, acrylic acid, oxalic acid, benzoic acid, maleic acid, propenoic acid, bis-glycolate ester of 5-sulfo isophthalate sodium salt, and combination of two or more thereof.

6. A process according to claim 3 wherein said carbonyl compound is terephthalic acid, dimethyl terephthalate, or combinations thereof.

7. A process according to claim 5 wherein said alcohol is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, and combinations of two or more thereof.

8. A process according to claim 6 wherein said alcohol is ethylene glycol.

9. A process according to claim 1 wherein said carbonyl compound is selected from the group consisting of terephthalic acid, dimethyl terephthalate, isophthalic acid, naphthalic acid, succinic acid, adipic acid, phthalic acid, glutaric acid, acrylic acid, oxalic acid, benzoic acid, maleic acid, propenoic acid, bis-glycolate ester of 5-sulfo isophthalate sodium salt, and combination of two or more thereof;

said titanium compound is selected from the group consisting of tetra isopropyl titanate, tetra n-butyl titanate, and combinations thereof; and said alcohol is selected from the group consisting of ethylene glycol, propylene glycol, isopropylene glycol, butylene glycol, 1-methyl propylene glycol, pentylene glycol, and combinations of two or more thereof.

10. A process according to claim 9 wherein said carbonyl compound is terephthalic acid, dimethyl terephthalate, or combinations thereof and said alcohol is ethylene glycol.

* * * * *